(12) United States Patent
Fielder

(10) Patent No.: US 6,681,181 B2
(45) Date of Patent: Jan. 20, 2004

(54) GPS RECEIVER WITH IMPROVED IMMUNITY TO BURST TRANSMISSIONS

(75) Inventor: Dennis Arthur Fielder, Royston (GB)

(73) Assignee: Sige Semiconductor Inc., Ottawa (CA)

( * ) Notice: Subject to any disclaimer, the term of this patent is extended or adjusted under 35 U.S.C. 154(b) by 0 days.

(21) Appl. No.: 10/147,983

(22) Filed: May 20, 2002

(65) Prior Publication Data

US 2003/0216863 A1 Nov. 20, 2003

(51) Int. Cl.[7] .................................................. G01S 5/02
(52) U.S. Cl. ................... 701/213; 342/357.12; 455/296
(58) Field of Search .............................. 701/213, 214, 701/207; 342/357.06, 357.12, 358; 455/296, 311

(56) References Cited

U.S. PATENT DOCUMENTS

| | | | | |
|---|---|---|---|---|
| 5,434,787 A | * | 7/1995 | Okamoto et al. ........... 701/214 |
| 5,808,582 A | * | 9/1998 | Woo ...................... 342/357.12 |
| 6,125,135 A | * | 9/2000 | Woo et al. .................. 375/130 |
| 6,182,011 B1 | * | 1/2001 | Ward ........................... 701/213 |
| 6,215,812 B1 | * | 4/2001 | Young et al. ............... 375/144 |
| 6,567,649 B2 | * | 5/2003 | Souissi ........................ 455/83 |

\* cited by examiner

*Primary Examiner*—Yonel Beaulieu
*Assistant Examiner*—Eric M Gibson

(57) ABSTRACT

GPS signals are typically weak and thus easily interfered with by other radio transmissions in the same or adjacent frequency bands. Interference can be especially problematic when the GPS receiver is co-located with a communications device that includes a radio transmitter, such as a cellular telephone. The transmitted signal from the co-located communication device can overload (or saturate) the GPS receiver front-end designed to receive weak GPS signals. In such a situation no useful information can be extracted from the received GPS signals originating from the GPS satellites. Described herein is a novel apparatus and method that can be used to minimize the effect of co-located interference on a GPS receiver.

21 Claims, 4 Drawing Sheets

GPS RECEIVER WITH IMPROVED IMMUNITY TO BURST TRANSMISSIONS

FIELD OF THE INVENTION

The invention relates to spread-spectrum communications and, in particular, to an improved GPS receiver in close proximity to a radio frequency transmitter.

BACKGROUND

The basic functionality of a Global Positioning System (GPS) receiver is to calculate the latitude, longitude and altitude of the GPS receiver's location (i.e., the co-ordinates of the receiver) upon receiving a number of GPS signals from a network of GPS satellites that orbit the earth. The calculation of the co-ordinates of the GPS receiver typically begins by comparing the timing associated with a select number of received GPS signals. After the initial comparison of the received GPS signals, values for timing corrections associated with the select group of received GPS signals are established. The timing corrections are made in order to solve a three-dimensional geometric problem, which has as its solution the co-ordinates of the GPS receiver.

The received GPS signals are typically weak and thus easily interfered with by other radio transmissions in the same or adjacent frequency bands. Interference can be especially problematic when the GPS receiver is co-located with a communications device that includes a radio transmitter, such as a cellular telephone. The transmitted signal from the co-located communication device can overload (or saturate) the GPS receiver front-end designed to receive weak GPS signals. In such a situation no useful information can be extracted from the received GPS signals originating from the GPS satellites.

In select instances this problem may be overcome by filtering all of the received signals from the GPS antenna before down conversion of the respective transmission signal band by the GPS receiver front-end. Typically a low noise amplifier (LNA) is first used to amplify the signal before further filtering or mixing to another frequency. The result of adopting this approach is that the loss of all signal energies in the filter reduces the sensitivity of the GPS receiver permanently, irrespective of whether or not the co-located communications device is transmitting. This is undesirable as the GPS signals received from the satellites are weak and reducing the sensitivity of the GPS receiver further reduces the operability of the system. Additionally, the filter would also occupy space, add cost to the unit and would draw additional power.

The problem caused by the co-located communications device may be alternatively overcome by the use of a high linearity LNA. This would ensure that the LNA is capable of amplifying the GPS signal despite the presence of a large interfering locally generated transmission. The disadvantage of this solution is that such an LNA would consume additional power, which is not acceptable in a portable battery powered device such as a cellular telephone. A filter following the LNA would also be required to provide sufficient rejection of the interfering signal to prevent overload of the next stage of the receiver, typically a mixer. These additional performance requirements increase the size, power consumption and cost of the filter and make implementing a highly integrated receiver design without the additional filter difficult.

Given that it is not easily possible to remove the effect of the interfering transmission, it is important to achieve the maximum performance possible despite the interference. A method of achieving this that has been commonly used is to employ a 'blanking' signal, derived from the transmitter of the co-located communications device and active whenever that transmitter is switched on, which is used to suppress the operation of the GPS receiver during the transmission. The disadvantage of this is that such a signal is not always easily derived from the co-located transmitter. Even if such a signal can be derived from the co-located transmitter, the physical construction of the unit may preclude the connection of the signal into the GPS receiver. For example, the GPS receiver and the communications device, while co-located, may not be physically constructed as a single unit. Furthermore, there may be more than one communications device, such as a cellular telephone with additional functions such as a short-range radio link.

Under these circumstances, it would be advantageous if the GPS receiver can determine for itself the period during which a co-located transmitter is active and take such action as to mitigate as far as possible the loss of performance caused by the interfering transmission.

SUMMARY OF THE INVENTION

The invention may be summarized according to one aspect as a method of limiting the effect of interfering transmission on a GPS (Global Positioning System) receiver, the GPS receiver having a radio front-end and a radio back-end, the radio front-end performing down-conversion of at least one GPS radio signal received at a Radio Frequency (RF) to an Intermediate Frequency (IF), and the radio back-end deriving a bit stream of digital data from the at least one GPS radio signal after it has been down converted to the IF and processing the bit-stream of digital data, the method comprising the steps of: i) sensing an overload condition in the radio front-end when the received radio signal is above a threshold; ii) generating an overload signal upon sensing the overload condition of the radio front-end; iii) coupling the overload signal into the radio backend; and iv) substituting in the radio back-end the bit-stream of digital data with a locally generated bit pattern in response to the presence of the overload signal, the locally generated bit pattern being selected such that when processed it causes less noise to accumulate in the radio back-end than if the bit-stream of digital data were processed.

According to another aspect the invention provides a GPS (Global Positioning System) receiver comprising a radio front-end and a radio back-end, the radio front-end performing down-conversion of at least one GPS radio signal received at a Radio Frequency (RF) to an Intermediate Frequency (IF), and the radio back-end deriving a bit-stream of digital data from the at least one GPS radio signal after it has been down converted to the IF and processing the bit-stream of digital data, an overload detector for generating an overload signal in the radio front-end when the received radio signal is above a threshold and sending the overload signal to the radio back-end; and means for substituting the bit-stream of digital data with a locally generated bit pattern in response to the presence of the overload signal, the locally generated bit pattern being selected such that when processed it causes less noise to accumulate in the radio back-end than if the bit-stream of digital data were processed.

According to another aspect the invention provides a GPS (Global Positioning System) receiver comprising a radio front-end and a radio back-end, the radio back-end deriving a bit-stream of digital data from at least one receiver GPS radio signal and processing the bit-stream of digital data, an overload detector for generating an overload signal in the radio front-end when the received radio signal is above a threshold and sending the overload signal to the radio back-end; and a means for substituting the bit-stream of digital data with a locally generated bit pattern in response to the presence of the overload signal, the locally generated bit pattern being selected such that when processed it causes less noise to accumulate in the radio back-end than if the bit-stream of digital data were processed.

According to another aspect the invention provides a method of limiting the effect of interfering transmission on a GPS (Global Positioning System) receiver, the GPS receiver having a radio front-end and a radio back-end, the radio back-end deriving a bit-stream of digital data from at least one GPS radio signal and processing the bit-stream of digital data, the method comprising the steps of: i) sensing an overload condition in the radio front-end when the received radio signal is above a threshold; ii) generating an overload signal upon sensing the overload condition of the radio front-end; iii) coupling the overload signal into the radio back-end; and iv) substituting in the radio back-end the bit-stream of digital data with a locally generated bit pattern in response to the presence of the overload signal, the locally generated bit pattern being selected such that when processed it causes less noise to accumulate in the radio back-end than if the bit-stream of digital data were processed.

Other aspects and features of the present invention will become apparent, to those ordinarily skilled in the art, upon review of the following description of the specific embodiments of the invention.

BRIEF DESCRIPTION OF THE DRAWINGS

Preferred embodiments of the invention will now be described in greater detail with reference to the accompanying diagrams, in which.

DETAILED DESCRIPTION OF THE INVENTION

Figure 1:
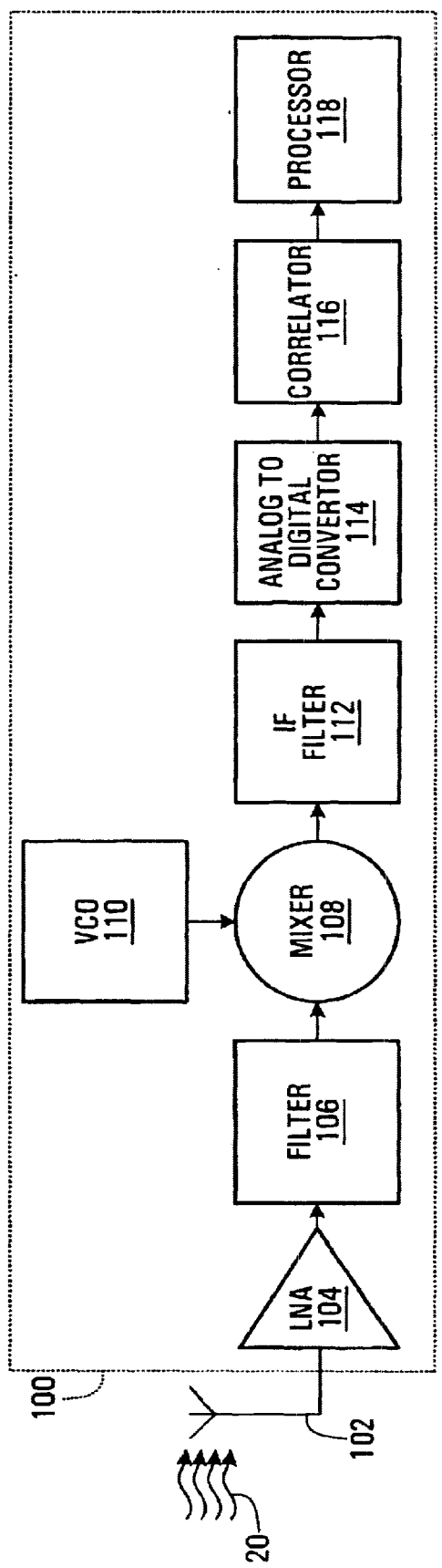
FIG. 1 is a block diagram illustrating a conventional Superheterodyne (superhet) GPS receiver.

The Superheterodyne (superhet) Architecture is a common receiver front-end architecture used for mobile communication applications. Shown in FIG. 1 is a simplified block diagram of a conventional GPS receiver 100 incorporating the superhet architecture. In FIG. 1 the superhet architecture comprises an antenna 102, a Low Noise Amplifier (LNA) 104, an optional image-rejection filter 106, a mixer 108, a Voltage Controlled Oscillator (VCO) 100 and an Intermediate Frequency (IF) filter 112.

A radio signal 20 at the radio frequency (RF) is first received by the antenna 102 and amplified by the LNA 20. The filter 106 then optionally filters the radio signal 20. The requirement for this filter can be removed by integrating its function into the LNA 20 or the mixer 108. The mixer 108 down-converts the radio signal 20 from the RF to the lower IF by using a local oscillator signal LO generating by the VCO 110. At this point the radio signal 20 is now centered on a low enough frequency where it is possible to perform the back-end processing.

The transition from front-end to back-end processing requires the radio signal 20 that has been down-converted to be filtered by the IF filter 112 and then passed to an analogue-to-digital converter (ADC) 114. The ADC 114 converts the radio signal 20 from a summation of analogue waveforms into a bit-stream of digital data that can be processed.

The back-end processing of received signals that is of concern to the present invention comprises a correlator 116 and a processor 118. GPS signals are modulated in a manner similar to CDMA transmissions, whereby pseudo-random codes are employed to identify each of the orbiting GPS satellites and aid in resolving the timing of the received GPS signals. As such the signals are processed digitally by logic which performs a correlation function in the correlator 116. In the correlator 116 the processing gain applied to the spread spectrum GPS signal raises the signal level above the noise being received when a local copy of the code specific to individual GPS satellite is placed in-phase with the received signal modulated with the same code. This correlation and synchronization process must be carried out for all the GPS satellites in order to identify the strongest set of signals to be used to calculate the GPS receiver's co-ordinates. The results are then passed from the correlator 116 to the processor 118 to determine the signal path delays to each of the satellites and hence enable calculation of the location of the receiver.

When a large interference signal is present, such as from a co-located or nearby transmitter, the front-end radio circuits become overloaded and the GPS signal is corrupted, preventing the correlator 116 block from obtaining useful information. As the correlator 116 cannot determine that the GPS signal is corrupted it continues to process the received signal 20, continuing to accumulate noise, so that the ratio of useful signal to noise (SNR) is reduced.

When operating under normal signal conditions the correlated GPS signal accumulates linearly with duration, while the noise accumulates with the square root of the duration, so increasing the duration improves the desired signal-to-noise ratio (SNR). When the system is overloaded the GPS signal is corrupted and the desired signal accumulation ceases while the noise accumulation continues to increase, resulting in a degradation of the signal-to-noise ratio.

Figure 2:
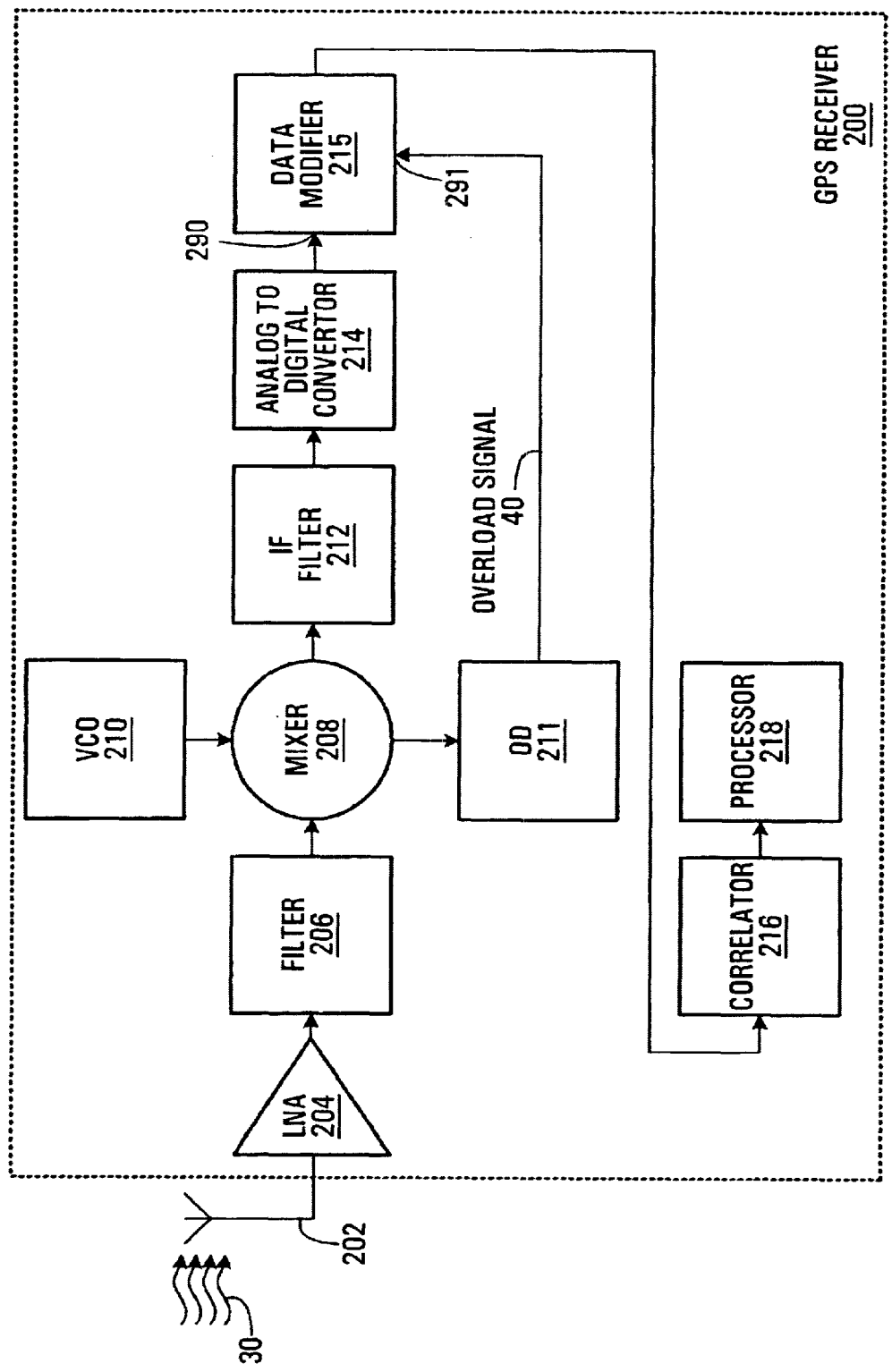
FIG. 2 is a block diagram a superhet GPS receiver improved according to aspects of the invention.

FIG. 2 is a simplified block diagram showing how the conventional GPS receiver 100 can be modified to provide an improved GPS receiver 200 according to aspects of the invention. The GPS receiver 200 also uses the superhet front-end architecture that was employed in the GPS receiver 100 of FIG. 1. Therefore an antenna 202, LNA 204, an optional filter 206, a mixer 208, a VCO 210 and an IF filter 212 all have the same basic functionality as the corresponding circuits 102, 104, 106, 108, 110 and 112 respectfully of the GPS receiver 100, shown in FIG. 1. The back-end of the GPS receiver 200 of FIG. 2 also includes an ADC 214, correlator 216 and a processor 218 corresponding respectively to the ADC 214, the correlator 116 and optionally a processor 218 shown in FIG. 1.

In addition to the aforementioned components, the GPS receiver 200 is improved by enabling the radio front-end to detect strong interfering signals and pass that information to the radio back-end. To this end a further circuit referred to as a overload detector 211 is connected to or is integrated into the mixer 208 and provides an electronic signal 40 hereinafter referred to as the overload signal. The overload signal 40 is then routed to the radio back-end. In the present embodiment of the invention, as shown in FIG. 2, a further circuit in the radio back-end referred to as a data modifier 215 accepts at a control input 291 the overload signal 40. The data modifier 215 is connected between the ADC 214 and the correlator 216, and receives at its data input 290 the output of the ADC 214.

More precisely, the overload signal 40 is derived from a point in the chain of circuits processing the radio signal (i.e. the radio front-end) which indicates that a large signal is present and the overload is at such a level that the GPS signal will be corrupted at the output of the ADC 214, preventing the system from obtaining useful information at this time from the correlator 216. This signal is shown as being derived from the mixer 208 in a overload detector 211 circuit but it could be derived from any of the front-end radio blocks where it is possible to distinguish the level of signal being received. For example, the overload signal 40 may be derived from the LNA 204 as a function of the linearity of operation of the LNA 204. Preferably, the overload detector 211 is integrated into the mixer 208 or any of the other front-end radio circuits. However, the overload detector 211 has been shown here as a separate block in order to discuss its function and highlight its presence in the radio front-end.

The data modifier 215 is meant to selectively substitute the output of the ADC 214 with a digital bit pattern constructed so as to prevent the correlator 216 from accumulating noise while the GPS signal is corrupted. The simplest sequence of bit values that accomplishes this is an alternating series of +1 and −1 values, though other patterns are possible. The values of +1 and −1 are often represented on the digital output as logic 1 and logic 0 respectively, though again other representations are possible which achieve the same purpose.

The replacement data stream has the desired property that when accumulated for a period of many data bits the average value substantially tends rapidly towards zero with a zero value standard deviation, while the random data stream normally present in the overload conditions tends towards zero but with a standard deviation proportional to the square root of the number of bits accumulated. This results in the noise accumulation in the correlator ceasing for the duration of the overload, so the desired signal-to-noise ratio does not decrease due to the overload condition.

Note that the digital data stream is often processed before being used by the correlator, for instance multiplying by the output of a numerically controlled digital oscillator to remove the intermediate frequency by down conversion to baseband. This type of processing does not change the statistical properties of the data stream regarding the accumulation of noise.

The overload signal 40 could be passed into a control input of the correlator block directly to provide another embodiment of the invention in which the correlator 216 directly accepts at a data input the output of the ADC 214. In such a case, there would be no need for an explicit data modifier 215 circuit, as the functionality of the data modifier 215 would be integrated into the correlator 216. However such an embodiment might not be practical as it is often the case that the radio circuits and the correlator circuits are built as separate integrated circuits making it difficult or impossible to couple an overload signal to the correlator.

Figure 3:
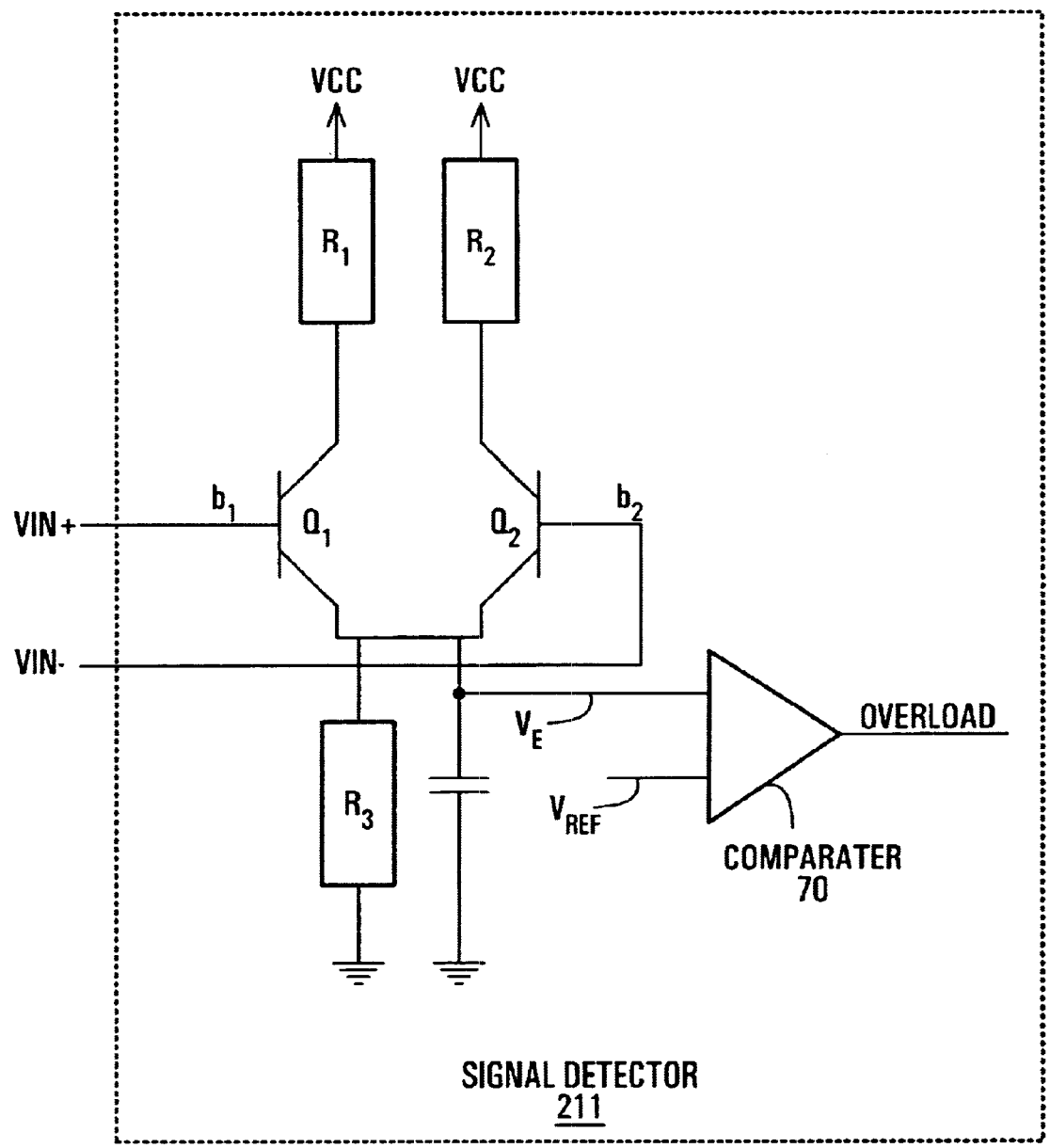
FIG. 3 is a schematic representation of a typical circuit for sensing a signal level.

FIG. 3 shows a typical embodiment of the overload detector 211. Assuming a differential signal path from the mixer 208, the level of the radio signal 30 is peak-detected by the action of a differential pair of bipolar junction transistors Q1 and Q2, each BJT having a base terminal b1 and b2 respectively. The base terminals b1 and b2 serve as the differential inputs to the overload detector 211 receiving a differential signal Vin from the mixer 208. The overload detector further comprises a resistor R3 and capacitor C connected in parallel between a common emitter node 60 and a ground (GND) voltage rail. Furthermore, the collector of each BJT Q1 and Q2 is connected to a power supply rail Vcc via transistors R1 and R2, respectively. Lastly, the emitter node 60 is connected to a comparator 70, the comparator also having a second input connected to a voltage reference VREF and an output from which the overload signal 40 can be tapped.

The overload detector 211 is actually a basic embodiment of an 'envelope detector' circuit. Such a circuit works by use of large signal swing non-linear operation, so small signal analysis typically employed in analogue circuit design does not explain its operation accurately. The circuit topology can be built up as follows. The basic operation of the overload detector 211 is to follow the envelope of an amplitude-modulated signal Vin, removing the carrier and giving an output—the overload signal 40—proportional to the amplitude of the radio signal 30.

The simplest envelope detector (not shown) is a series diode feeding a capacitor in parallel with a resistor. The capacitor charges via the diode on the signal peaks, and discharges (slowly with respect to the carrier period, rapidly with respect to the modulation period) via the resistor. This simple circuit has a very low input non-linear impedance (essentially zero on the charging peaks, infinite at other times) so the diode is replaced with a transistor. As the input rises the transistor turns on and charges the capacitor from the supply line, as it then drops the transistor turns off, leaving the capacitor with the peak voltage (minus a VBE drop, a permanent offset). The input impedance is thus higher, though still non-linear.

The transistor version still only works on one polarity peak, so by having a differential input both positive and negative signal peaks can both be used, which has the benefit of doubling the carrier ripple frequency, making the choice of RC time constant slightly easier. The resistance value R has to be chosen considering DC bias conditions as well as the RC time constant.

A practical circuit is more complex, as DC variations due to process variation, temperature and supply voltage all need compensating, as well as circuits to bias the circuit to work with signal levels small compared to a VBE drop.

During normal operation, i.e., small signal operation of the radio front-end the overload detector 211 receives the differential input Vin from the mixer 208. The voltage at the emitter node 60 VE remains at a nominal voltage ensuring that both BJT are operating in their active mode, i.e., they are turned on. When the nominal voltage is compared to the reference voltage VREF the derived overload signal 40 represents a nominal condition where the radio front-end is not being overloaded.

However, during large signal operation, i.e., overload operation the differential input Vin received from the mixer 208 causes the BJT's Q1 and Q2 to switch on and off depending on the phase of the signal at any given instant. The large input signal swing causes the instantaneous base voltage at any given instance to be very large and in turn forces the common emitter node 60 voltage VE to rise such that the base-emitter voltage remains approximately equal to the 0.7 Volt threshold voltage intrinsic to the base-emitter PN junction of the BJT. Once VE rises significantly in relation to VREF the comparator switches the overload signal 40 to indicate that the radio front-end is being overloaded by a strong transmission within the same transmission band or within an adjacent signal band.

Figure 4:
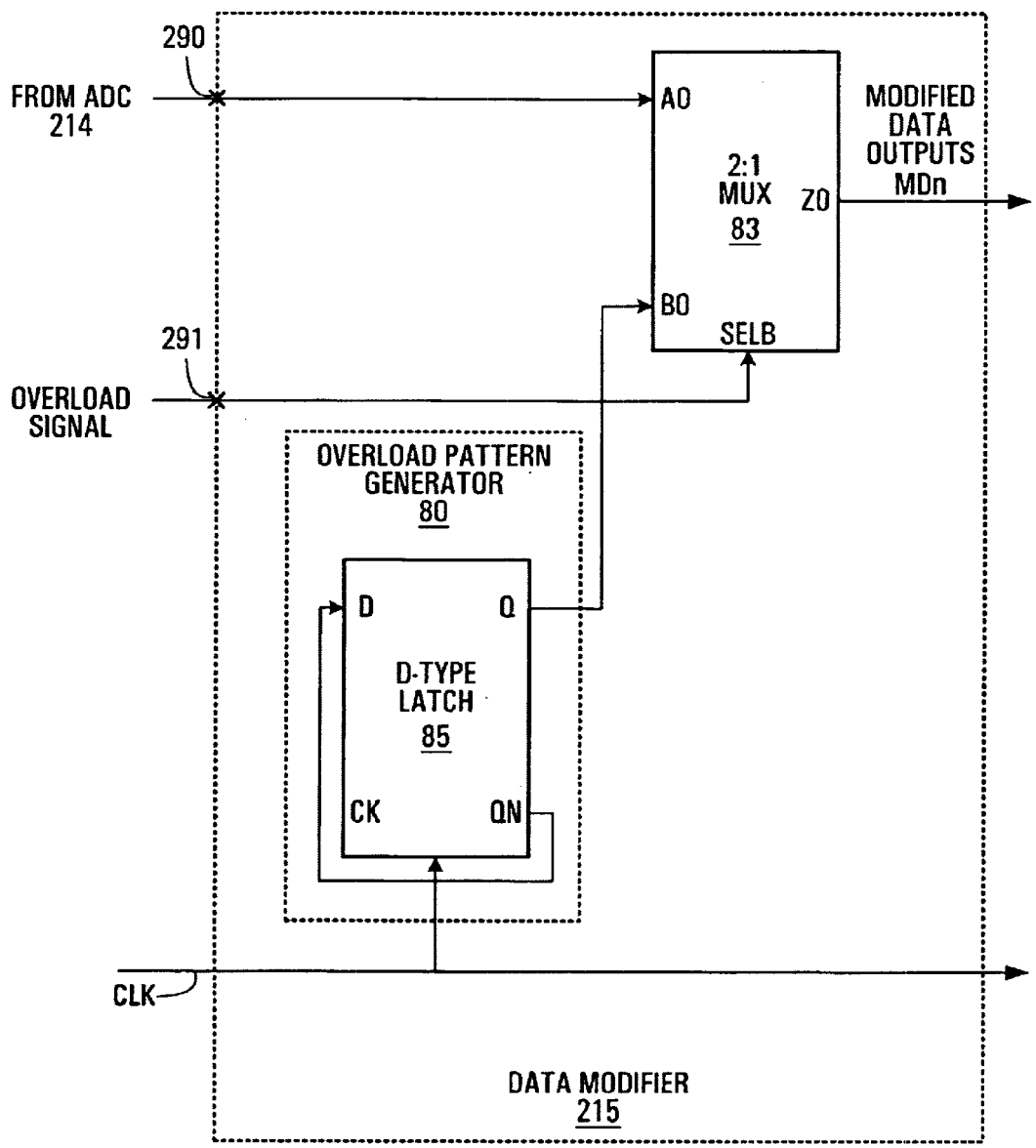
FIG. 4 is a schematic representation of an embodiment of a data modifier circuit according to aspects of the invention.

FIG. 4 shows a specific embodiment of the data modifier 215. The control input 291 of the data modifier is connected to receive the overload signal from the radio front-end. In this embodiment the overload signal 40 is the control signal for a 2:1 Multiplexer (MUX) 83. The overload signal 40 can be active high or active low depending upon the design choices made by one skilled in the art without unnecessary experimentation. The MUX 83 has two other inputs A0 and B0, one of which at any given instant is selectively coupled to the MUX 83 output Z0. The input A0 is connected to the data input 290 of the data modifier, which is externally connected to receive the output of the ADC 214. The MUX 83 output Z0 is also the output of the data modifier 215. As shown in FIG. 4 the digital output (bit stream) from the ADC 214 is connected to input A0. The digital output of the ADC 215 is coupled to the output of the data modifier 215 via the MUX 83 when the radio front-end is not experiencing overload conditions. However when the radio front-end is experiencing overload conditions the overload signal 40 will be driven active to indicate this fact and the MUX 83 will couple B0 to its output Z0. Connected to B0 is an overload pattern generator 80. In this embodiment the overload pattern generator 80 delivers an alternating series of logic 1's and 0's. This pattern is generated by coupling the inverting output QN of a D-type latch 85 to its input terminal D and using the non-inverting output Q as the source of the overload pattern to be connected the MUX 83 input B0. Furthermore, the pattern alternates according to a digital clock signal CLK that provides the timing for digital circuits in the radio back-end.

The overload detector 211 described above is only one embodiment of a signal detection means that is usable according to aspects of the invention. Other well known signal detection means could also be used.

Similarly, although down converting the received radio signal from the RF to the IF was a feature used in the embodiment disclosed, the modifications to the GPS receiver according to aspects of the invention could be employed in a radio receiver that did not have down conversion as a feature. In other words the digital signal processing may take place at the RF; however, this would not affect the operability of the invention disclosed when applied to such a radio receiver.

The proposed improvement has the additional benefit that it can be fitted to systems based on existing correlators and processor devices without requiring their modification in order to gain the system advantage shown.

The overload signal 40 can also be used as an input to other circuit blocks in the receiver, such as automatic gain control circuits, in order to assist the circuit to recover rapidly from the overload condition.

We can determine the benefits to be gained from the present invention as follows. Assume for simplicity the transmission sequence as used by the GSM cellular standard, though any time division duplex or time division multiple access system could be substituted by changing the various parameters discussed.

A co-located transmitter is turned on for a burst period corresponding to one or more slots in a frame of a preset number of slots, 8 in the case of GSM. The GSM enhancement known as GPRS allows the transmitter to be switched on for 2 or 4 slots rather than the 1 slot used normally for voice. The co-located transmitter is therefore on for a proportion of the time varying from ⅛ to ½ depending on the mode of operation. Defining the proportion of time the transmitter is on to be f, where f varies from 0 to 1.0, typically being 0.125 to 0.5 in the GSM/GPRS situations previously discussed.

For GPS receivers without the improvements provided by aspects according to the invention, the GPS system performance is changed by 20log(1−f) dB. Alternatively, for GPS receivers able to benefit from the improvements provided by aspects of the invention the GPS system performance changes by only 10log(1−f) dB. These values are tabulated below for example values of f.

| | System change of performance (dB) | |
|---|---|---|
| F | Normal System | Improved System |
| 0 | 0.0 | 0.0 |
| 0.125 | −1.2 | −0.6 |
| 0.25 | −2.5 | −1.2 |
| 0.375 | −4.1 | −2.0 |
| 0.5 | −6.0 | −3.0 |
| 0.625 | −8.5 | −4.3 |
| 0.875 | −18.1 | −9.0 |

This demonstrates that even a single slot system will benefit by 0.6 dB, and as GPRS systems become more common a benefit of 3 dB will often occur.

What has been described is merely illustrative of the application of the principles of the invention. Other arrangements and methods can be implemented by those skilled in the art without departing from the spirit and scope of the present invention.

What is claimed is:

1. A method of limiting the effect of interfering transmission on a GPS (Global Positioning System) receiver, the GPS receiver having a radio front-end and a radio back-end, the radio front-end performing down-conversion of at least one GPS radio signal received at a Radio Frequency (RF) to an Intermediate Frequency (IF), and the radio back-end deriving a bit stream of digital data from the at least one GPS radio signal after it has been down converted to the IF and processing the bit-stream of digital data, the method comprising the steps of:

i) sensing an overload condition in the radio front-end when the received radio signal is above a threshold;

ii) generating an overload signal upon sensing the overload condition of the radio front-end;

iii) coupling the overload signal into the radio backend; and iv) substituting in the radio back-end the bit-stream of digital data with a locally generated bit pattern in response to the presence of the overload signal, the locally generated bit pattern being selected such that when processed it causes less noise to accumulate in the radio back-end than if the bit-stream of digital data were processed.

2. A method according to claim 1, wherein the step of sensing the overload condition is carried out by measuring an amplitude envelope of the received radio signal.

3. A method according to claim 1, wherein the step of sensing the overload condition is carried out by measuring a signal to noise ratio of the received radio signal.

4. A method according to claim 1, wherein the step of sensing the overload condition is carried out by measuring a carrier to interference ratio of the received radio signal.

5. A method according to claim 1, wherein the locally generated bit pattern is an alternating sequence of high and low binary values.

6. A method according to claim 1, wherein the locally generated bit pattern is a pseudo random sequence.

7. A method according to claim 1, wherein the locally generated bit pattern has the property of an average value tending rapidly towards zero with a substantially zero value standard deviation.

8. A GPS (Global Positioning System) receiver comprising a radio front-end and a radio back-end, the radio front-end performing down-conversion of at least one GPS radio signal received at a Radio Frequency (RF) to an Intermediate Frequency (IF), and the radio back-end deriving a bit-stream of digital data from the at least one GPS radio signal after it has been down converted to the IF and processing the bit-stream of digital data, an overload detector for generating an overload signal in the radio front-end when the received radio signal is above a threshold and sending the overload signal to the radio back-end; and means for substituting the bit-stream of digital data with a locally generated bit pattern in response to the presence of the overload signal, the locally generated bit pattern being selected such that when processed it causes less noise to accumulate in the radio back-end than if the bit-stream of digital data were processed.

9. A GPS receiver according to claim 8 wherein the radio back-end comprises an analog-to-digital converter and a correlator and wherein the means for substituting the bit-stream of digital data with a locally generated bit pattern comprises a data modifier having a data input connected to received the output of the analog-to-digital converter and the data modifier having a control input connected to receive the overload signal from the overload detector, the data modifier generating and substituting the locally generated bit pattern for the bit-stream of digital data that is input to the correlator when the overload signal is a value that indicates the radio front-end is being overloaded.

10. A GPS receiver according to claim 9, wherein the locally generated bit stream is an alternating sequence of high and low binary values.

11. A GPS receiver according to claim 9, wherein the locally generated bit stream is a pseudo random sequence.

12. A GPS receiver according to claim 9, wherein the locally generated bit stream has the property of an average value tending rapidly towards zero with a substantially zero value standard deviation.

13. A GPS receiver according to claim 8 wherein the radio back-end comprises an analog-to-digital converter and a correlator, the correlator having a data input connected to receive the output of the analog-to-digital converter and wherein the means for substituting comprises the correlator having a control input connected to receive the overload signal from the overload detector, the correlator generating and substituting the locally generated bit pattern for the bit-stream of digital data that is used with the correlator when the overload signal is a value that indicates the radio-front end is being overloaded.

14. A GPS receiver according to claim 13, wherein the locally generated bit stream is an alternating sequence of high and low binary values.

15. A GPS receiver according to claim 13, wherein the locally generated bit stream is a pseudo random sequence.

16. A GPS receiver according to claim 13, wherein the locally generated bit stream has the property of an average value tending rapidly towards zero with a substantially zero value standard deviation.

17. A communications device comprising a radio transmitter and a co-located GPS (Global Positioning System) receiver according to claim 8.

18. A GPS (Global Positioning System) receiver comprising a radio front-end and a radio back-end, the radio back-end deriving a bit-stream of digital data from at least one receiver GPS radio signal and processing the bit-stream of digital data, an overload detector for generating an overload signal in the radio front-end when the received radio signal is above a threshold and sending the overload signal to the radio back-end; and a means for substituting the bit-stream of digital data with a locally generated bit pattern in response to the presence of the overload signal, the locally generated bit pattern being selected such that when processed it causes less noise to accumulate in the radio back-end than if the bit-stream of digital data were processed.

19. A method of limiting the effect of interfering transmission on a GPS (Global Positioning System) receiver, the GPS receiver having a radio front-end and a radio back-end, the radio back-end deriving a bit-stream of digital data from at least one GPS radio signal and processing the bit-stream of digital data, the method comprising the steps of:

i) sensing an overload condition in the radio front-end when the received radio signal is above a threshold;

ii) generating an overload signal upon sensing the overload condition of the radio front-end;

iii) coupling the overload signal into the radio back-end; and iv) substituting in the radio back-end the bit-stream of digital data with a locally generated bit pattern in response to the presence of the overload signal, the locally generated bit pattern being selected such that when processed it causes less noise to accumulate in the radio back-end than if the bit-stream of digital data were processed.

20. A GPS (Global Positioning System) receiver, the GPS receiver having a radio front-end and a radio back-end, the radio front-end performing down-conversion of at least one GPS radio signal received at a Radio Frequency (RF) to an Intermediate Frequency (IF), and the radio back-end deriving a bit stream of digital data from the at least one GPS radio signal after it has been down converted to the IF and processing the bit-stream of digital data;

wherein the radio front-end comprises an antenna, a low noise amplifier, a filter, a mixer, an IF filter and an overload detector connected to sense the level of the received radio signal and generate an overload signal when the receiver radio signal is above a threshold; and wherein the radio back-end comprises an analog-to-digital converter, a data modifier and a correlator, the data modifier having a data input connected to receive the output of the analog-to-digital converter and a control input connected to receive the overload signal.

21. A GPS receiver according to claim 20, wherein the overload detector is connected to the mixer.

* * * * *

UNITED STATES PATENT AND TRADEMARK OFFICE
CERTIFICATE OF CORRECTION

PATENT NO. : 6,681,181 B2  
APPLICATION NO. : 10/147983  
DATED : January 20, 2004  
INVENTOR(S) : Dennis A. Fielder Page 1 of 1

It is certified that error appears in the above-identified patent and that said Letters Patent is hereby corrected as shown below:

Title Page, item [56] add the following
-- U.S. PATENT DOCUMENTS
0012411    31/1/02     Heinzl et al.........375/350;
5768319    16/06/98    Duboraw III........375/316;
4743863    10/05/88    Cassaoy et al.......330/284; --

Title Page, under item [56] add the following
-- FOREIGN PATENT DOCUMENTS
JP   11202040   19/01/98
EP   0777337    27/11/96 --

Signed and Sealed this
Seventeenth Day of May, 2011

David J. Kappos
*Director of the United States Patent and Trademark Office*